United States Patent
Fumaroli et al.

(10) Patent No.: US 8,577,025 B2
(45) Date of Patent: Nov. 5, 2013

(54) METHOD OF EXECUTING AN ALGORITHM FOR PROTECTING AN ELECTRONIC DEVICE BY AFFINE MASKING AND ASSOCIATED DEVICE

(75) Inventors: Guillaume Fumaroli, Paris (FR); Sylvain Lachartre, La Garenne Colombes (FR); Jean Martinelli, Paris (FR); Emmanuel Prouff, Paris (FR); Mathieu Rivain, Paris (FR)

(73) Assignee: Thales, Neuilly sur Seine (FR)

( * ) Notice: Subject to any disclaimer, the term of this patent is extended or adjusted under 35 U.S.C. 154(b) by 451 days.

(21) Appl. No.: 12/891,895

(22) Filed: Sep. 28, 2010

(65) Prior Publication Data
US 2011/0129084 A1    Jun. 2, 2011

(30) Foreign Application Priority Data
Sep. 29, 2009    (FR) ...................................... 09 04642

(51) Int. Cl.
*H04L 29/06*    (2006.01)

(52) U.S. Cl.
USPC .......................................................... 380/28

(58) Field of Classification Search
None
See application file for complete search history.

(56) References Cited

U.S. PATENT DOCUMENTS

| 2006/0002548 | A1* | 1/2006 | Chu | ................................. | 380/28 |
| 2007/0273408 | A1* | 11/2007 | Golic | .............................. | 326/93 |
| 2008/0260145 | A1* | 10/2008 | Trichina | ........................... | 380/46 |

FOREIGN PATENT DOCUMENTS

DE    19822217    11/1999

OTHER PUBLICATIONS

Golic, et al., "Multiplicative Masking and Power Analysis of AES," Cryptographic Hardware and Embedded Systems, CHES 2002, pp. 198-212, XP009112643 (Jan. 1, 2002).

* cited by examiner

*Primary Examiner* — Philip Chea
*Assistant Examiner* — Kendall Dolly
(74) *Attorney, Agent, or Firm* — Baker & Hostetler LLP

(57) ABSTRACT

A method of executing an algorithm includes protecting an electronic device by affine masking. The electronic device executes operations on secret variables x, the secret variables x being binary vectors of a given size N other than zero. The method further includes replacing the secret variables x using an affine masking operation, by the following affine function: $m(x)=R.x+r$, where R is a random invertible binary matrix with N rows and N columns and r is a random binary vector of size N.

15 Claims, 4 Drawing Sheets

METHOD OF EXECUTING AN ALGORITHM FOR PROTECTING AN ELECTRONIC DEVICE BY AFFINE MASKING AND ASSOCIATED DEVICE

CROSS-REFERENCE TO RELATED APPLICATION

This application claims priority to foreign French patent application No. FR 09 04642, filed on Sep. 29, 2009, the disclosure of which is incorporated by reference in its entirety.

FIELD OF THE INVENTION

The present invention relates to a method of executing an algorithm for protecting secret data in an electronic device such as a smart card or a cryptographic component. The secret data to be protected are, for example, variables used in operations executed by a data encryption algorithm. The invention also relates to a device for implementing this method of protecting secret data.

BACKGROUND OF THE INVENTION

The operations executed by a cryptographic device cause variations of physical quantities. These variations differ according to the data processed, which can be measured by an attacker, for example by measuring the power consumption of the device or its electromagnetic radiation. An attacker can use these measurements to obtain information about the secret data handled in the device. To provide a defense against such an attacker, the designer of the device must adapt the executed operations in such a way that the measurable variations caused by them are independent of the secret data.

One method of attacking a device in order to discover the secret data contained in it, known to those skilled in the art, is the "side channel attack". In this form of attack, the power consumption of the device is measured and this measurement is used to deduce the information contained in it. A defense against such attacks can be provided by a known protection method in which all the sensitive variables x of the algorithm are combined with a random data r. Thus each intermediate variable handled by the device can be written as a function of x and r, $m_r(x)$. One of the limitations of this solution is that it is necessary to ensure that x can be retrieved from $m_r(x)$ at any step of the algorithm in question. To achieve this, all the operations executed on the variable x must be adapted to allow for the masking method $m_r$.

In the case of block encryption algorithms, the sensitive data x handled by this type of algorithm are masked by means of the function $m_r(x)=x+r$, where r is a random variable and the sign '+' refers to the Exclusive OR (XOR) operation.

This method, known in the prior art, is easily implemented, because all the linear or affine operations executed by the algorithm to be protected can be adapted immediately. Furthermore, this method is effective against first-order side channel attacks, in other words those using a single measurement point, such as the power consumption of the device.

One of the main problems of the prior art solution using masking with a function of the type $m_r(x)=x+r$ is that it has low resistance to higher-order side channel attacks, in other words those using a plurality of measurement points instead of a single point. This is because the information associated with two points in the measurements corresponding to the processing of the variables $x_1+r$ and $x_2+r$ is strongly correlated with $x_1+x_2$, resulting in low resistance to the more advanced forms of attack called k-th order attacks, where k is an integer greater than 1.

However, this problem can be resolved by extending the initial solution to a number k of random variables such that masking with a function $m_r(x)=x+r_1+r_2+\ldots+r_k$ is used, where the variables $r_1, r_2, \ldots, r_k$ are handled separately. However, this solution does not resolve the problem of an attacker using an indefinite number of measurement points, and moreover it leads to additional implementation costs which are unacceptable in practice when k is large. Furthermore, there is no known solution for implementing such a solution when k is greater than or equal to three.

None of the prior art solutions is capable of resisting known attacks of any order k greater than 1 at an additional complexity cost which is acceptable.

SUMMARY OF THE INVENTION

In order to remedy the drawbacks of the prior art, the present invention proposes a solution in which every intermediate variable x handled by operations executed in the device whose content is to be protected is masked by using affine applications of the m(x)=Rx+r type, where R is a binary invertible matrix. The operations executed by the device are adapted using the mathematical properties of the affine application. This solution enables known attacks of orders greater than one to be resisted, at a lower cost, since the known methods of inferring secret data by using the information associated with at least two measurement points corresponding to the processing of intermediate data will fail when these data are masked by an affine application, by contrast with the prior art solution.

The invention relates to any device capable of implementing cryptographic algorithms or algorithms comprising secret data, for protecting these data against access by persons acting with malicious intent. More specifically, but not exclusively, the invention can be applied to a computer, a mobile terminal, or a smart card. The invention is also applicable to any type of cryptographic algorithm, notably a public key or private key algorithm.

For this purpose, the invention proposes a method of execution including a step of protecting an electronic device by affine masking, where said device executes operations on secret variables x, said variables x being binary vectors of a given size N other than zero, said method being characterized in that said variables x are replaced, using what is known as an affine masking operation, by the following affine function: m(x)=R.x+r, where R is a random invertible binary matrix with N rows and N columns and r is a random binary vector of size N.

In a variant embodiment of the invention, said operation of affine masking of a secret variable x is executed by means of the following steps:

generate, for each binary vector z of size N, the table T such that T[z]=Rz+r, replace said secret variable x with T[x].

In a variant embodiment of the invention, said electronic device executes at least one linear operation on a set of secret variables $z_1, \ldots, z_m$, producing the result $z=A_1z_1+A_2z_2+\ldots+A_mz_m$, where the variables $A_1, A_2 \ldots A_m$ are matrices each of which commutes with the matrix R and its inverse $R^{-1}$, and the operation of affine masking of said result z is carried out by means of the following steps:

apply said operation of affine masking to the set of said variables $z_1, \ldots z_m$ in order to produce the set of masked variables $\overline{z_1}, \ldots, \overline{z_m}$, determine, from said random vector r and a second random binary vector r', a third random vector $r''=r'+(A_1+\ldots+A_m)r$, determine the result $\bar{z}$ of the affine masking operation applied to the result z of said linear operation, by means of the following calculation steps:

$$\bar{z}=A_1\bar{z_1}+r''$$

For i varying from 2 to m, $$\bar{z}=\bar{z}+A_i\bar{z_i}$$

$$\bar{z}=\bar{z}+r+r'$$

In a variant embodiment of the invention, said electronic device executes at least one linear operation on a set of secret variables $z_1, \ldots, z_m$ of size N, producing the result $z=A_1z_1+A_2z_2+\ldots+A_mz_m$, where the variables $A_1, A_2 \ldots A_m$ are matrices which do not commute with the matrix R and its inverse $R^{-1}$, and the operation of affine masking of said result z is carried out by means of the following steps:

determine, for the set of said binary vectors x of size N, the table $T_R$, such that $T_R[x]=Rx$, determine, for the set of said binary vectors x of size N, the table $T_R^{-1}$, such that $T_R^{-1}[x]=R^{-1}x$, determine, for the set of said binary vectors x of size N, the tables $\overline{A_i}$ such that $\overline{A_i}[x]=T_R[A_iT_R^{-1}[x]]$, for i varying from 1 to m, apply said operation of affine masking to the set of said variables $z_1, \ldots z_m$ in order to produce the set of masked variables $\overline{z_1}, \ldots, \overline{z_m}$, calculate, from said random vector r and a second random binary vector r', the binary vector $r''=(\overline{A_1}[r]+\ldots+\overline{A_m}[r])+r'$, determine the result $\bar{z}$ of the affine masking operation applied to the result z of said linear operation, by means of the following calculation steps:

$$\bar{z}=\overline{A_1}[\bar{z_1}]+r''$$

For i varying from 2 to m, $$\bar{z}=\bar{z}+\overline{A_i}[\bar{z_i}]$$

$$\bar{z}=\bar{z}+r+r'$$

In a variant embodiment of the invention, said electronic device executes at least one non-linear operation S on at least one secret variable y, producing the result y'=S(y), and the operation of affine masking said result y' is executed by means of the following steps:

apply said affine masking operation to the secret variable y in order to produce the result $\bar{y}=R\cdot y+r$, determine an adapted operation S' of the non-linear operation S by means of the following relation: $S''(\bullet)=R\cdot S(R^{-1}\cdot(\bullet+r))+r$, determine the result $\bar{y'}$ of the affine masking operation applied to the result y' of said non-linear operation, by means of the following relation: $\bar{y'}=S'(\bar{y})$ In a variant embodiment of the invention, said electronic device executes a cryptographic algorithm.

The invention also includes an electronic device for executing operations on the secret variables x, comprising means to protect said variables x by applying the steps of the affine masking protection method described above.

In a variant embodiment of the invention, said device is a microcircuit card.

BRIEF DESCRIPTION OF THE DRAWINGS

Other characteristics will be made clear by the following detailed description, given by way of non-limiting example with reference to the appended drawings, in which.

DETAILED DESCRIPTION

In order to overcome the limitations of the prior art described above, the present invention proposes a method for masking sensitive data by means of affine functions. Notably, the method according to the invention relates to the execution of a data masking algorithm for the purpose of protecting sensitive data. The masking function used in this case to protect a variable x is:

$$m(x)=R.x \oplus r, \qquad (1)$$

where x is a sensitive variable, such as one handled by an encryption algorithm implemented by a cryptographic device, this variable being represented by a binary vector with N components, where N>0;

R is an invertible random binary matrix, in other words one containing no values other than 0 and 1, with a size of N×N;

r is a random vector, which is also binary, of size N;

$\oplus$, is the "exclusive or" operation.

The method according to the invention consists, notably, in replacing a variable x with m(x) in order to make it less vulnerable to an attack. This operation is called a masking operation, and in the context of the invention it is an affine masking operation.

This method can be implemented, notably but not exclusively, in two different ways.

In a first embodiment, the affine masking function m(x) is executed by means of a correlation table T[x] which contains the set of values of m(x)=R.x $\oplus$r for all possible values of the variable x. For a vector x comprising N bits, therefore, there are $2^N$ possible values. Thus the generation of the correlation table T[x] comprises the following steps:

random drawing of the binary vector r of size N, random drawing of an invertible binary matrix R of size N×N, calculation of m(x)=R.x$\oplus$r for all possible values of x.

For a given sensitive variable x handled by the device to be protected, the affine masking according to the invention is then executed by extracting the corresponding value m(x) in the table T[x].

In a second embodiment, the affine masking function m(x) can be generated directly when the sensitive variable x is to be protected. For this purpose, the invertible binary matrix R and the binary vector r are generated at random for each variable x at the instant when this variable is used in the encryption algorithm.

The variable x handled by the implemented algorithm can be subjected to linear or non-linear operations.

The method according to the invention also consists in adapting these operations in order to mask their result without requiring excessively complex calculations.

Figure 1A:
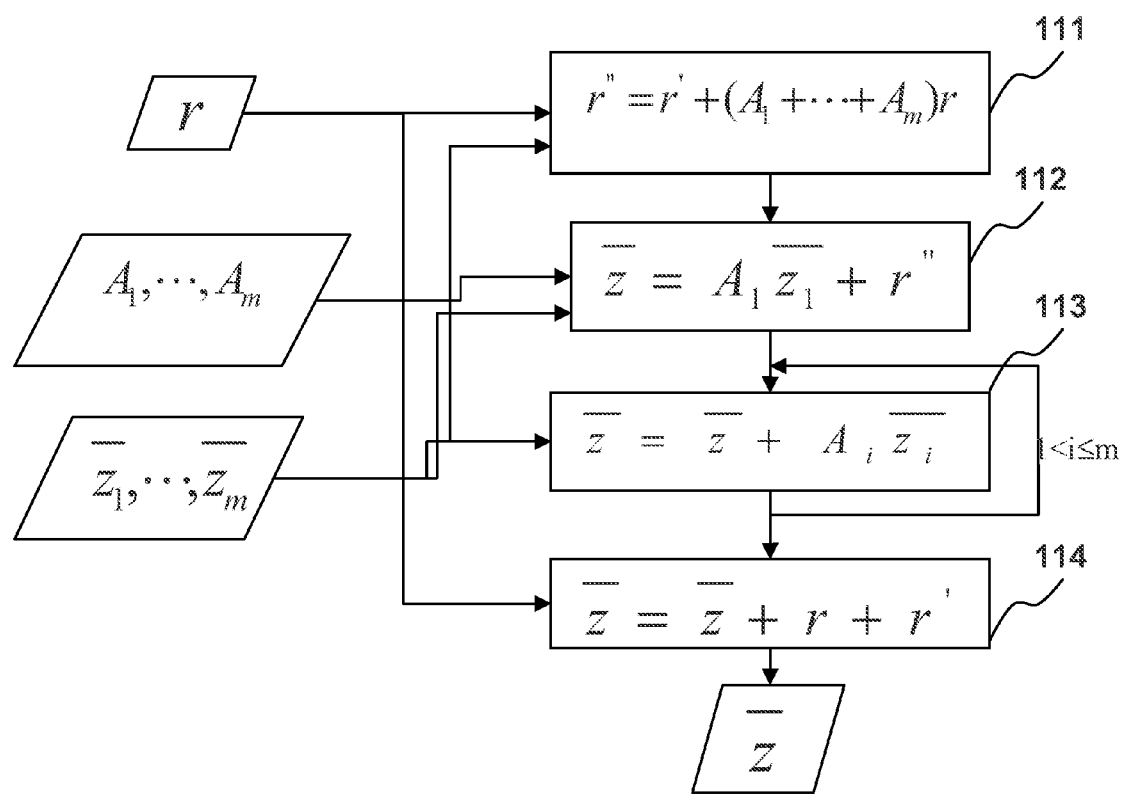
FIG. 1a is a diagram showing in a schematic way the affine masking method according to the invention applied to a linear transformation, in the case where the matrices $A_1, \ldots, A_m$, which are coefficients of the linear transformation, commute with the matrices R and $R^{-1}$.

FIG. 1a shows in a schematic way the steps implemented in the masking of a linear combination of masked variables in the case where the matrices $A_1, \ldots, A_m$ commute with the matrices R and $R^{-1}$.

Consider the general case of the linear operation defined by the following relation:

$$z = A_1 z_1 + A_2 z_2 + \ldots + A_m z_m \quad (2)$$

where $z_1, \ldots, z_m$ are sensitive variables of size N and $\overline{z_1}, \ldots, \overline{z_m}$ represent their versions masked by means of the affine masking method according to the invention, written with the aid of the relation $\overline{z_i} = R \cdot z_i + r$.

The matrices $A_1, \ldots, A_m$ are invertible binary matrices with N rows and N columns.

In the special case in which the variables $A_1, \ldots, A_m, z_1, \ldots, z_m$ can be considered as elements of the finite Galois field $GF(2^N)$ with a cardinal number $2^N$, the variable R is found by randomly drawing an invertible matrix element of $GF(2^N)$. The variable r is found by randomly drawing a vector element of $GF(2^N)$. The table T is generated by tabulating the values of the application $x \to m(x) = Rx + r$ for all the vectors x belonging to $GF(2^N)$. In this case, the matrices $A_1, \ldots, A_m$ commute with the matrices R and $R^{-1}$. It should be remembered that the matrix $A_i$ commutes with the matrix R if $A_i R = R A_i$.

The variable z can then be masked by executing the following calculation steps.

In a first step 111, a random variable r' is generated by random drawing of a vector from the finite field $GF(2^N)$ and the variable r" is calculated from r' and from the random variable r used to mask the sensitive variables $z_1, \ldots z_m$ according to the following relation:

$$r'' = r' + (A_1 + \ldots + A_m) r \quad (3)$$

In a second step 112, the result of the masking $\overline{z}$ is initialized:

$$\overline{z} = A_1 \overline{z_1} + r'' \quad (4)$$

In a third iteration step 113, the masked variable $\overline{z}$ is updated by carrying out the following calculation for i varying from 2 to m:

$$\overline{z} = \overline{z} + A_i \overline{z_i} \quad (5)$$

In a final step 114, the variable $\overline{z}$ resulting from the affine masking of the linear combination of m other variables is delivered:

$$\overline{z} = \overline{z} + r + r' \quad (6)$$

Figure 1B:
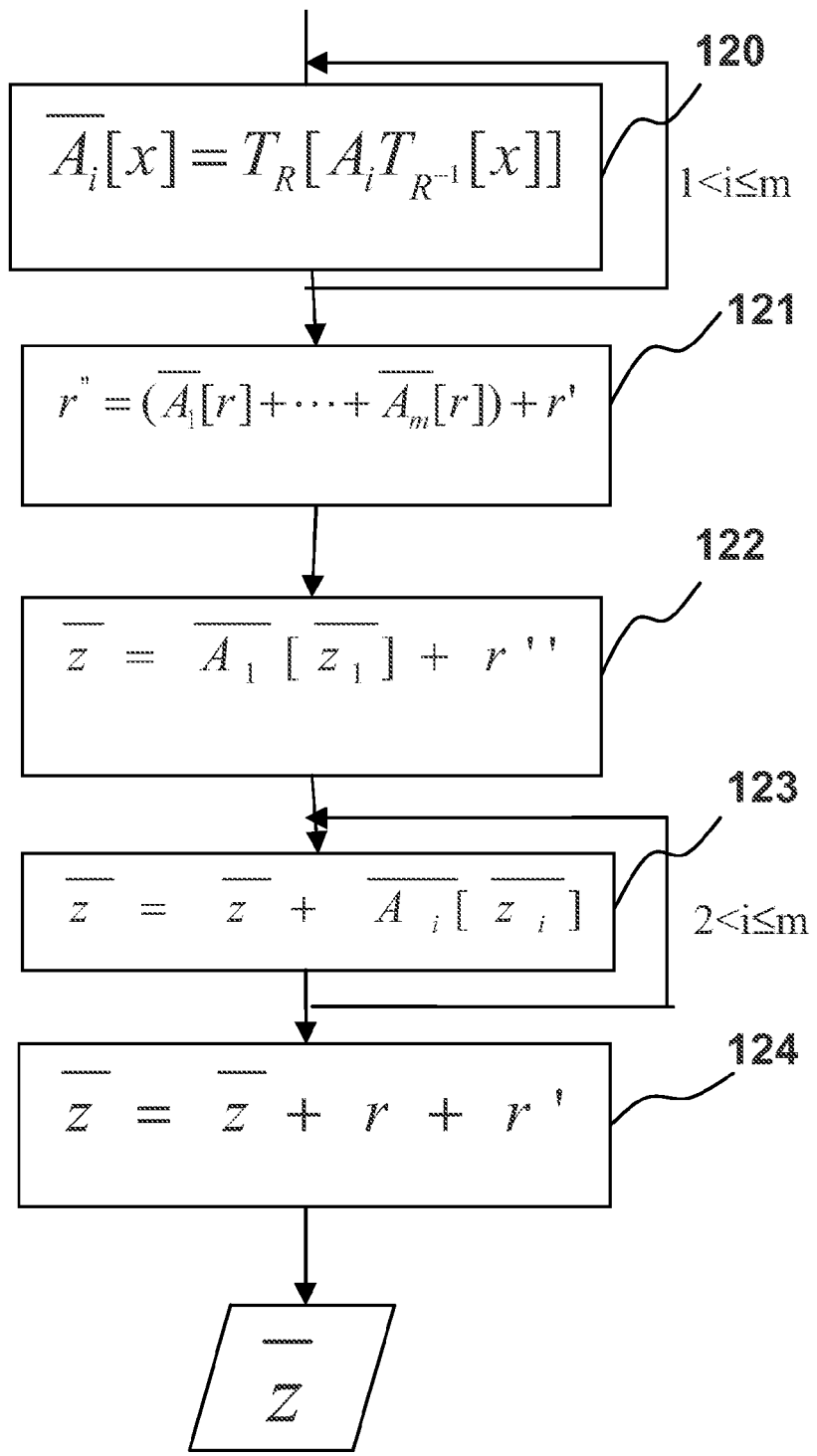
FIG. 1b is a diagram showing in a schematic way the affine masking method according to the invention applied to a linear transformation, in the case where the matrices $A_1, \ldots, A_m$, which are coefficients of the linear transformation, do not commute with the matrices R and $R^{-1}$.

FIG. 1b shows in a schematic way the steps implemented in the masking of a linear combination of masked variables in the case where the matrices $A_1, \ldots, A_m$ do not commute with the matrices R and $R^{-1}$.

If the matrices $A_1, \ldots, A_m$ do not commute with the matrices R and $R^{-1}$, the tables $T_R$ and $T_{R-1}$ of the applications $x \to Rx$ and $x \to R^{-1}x$ respectively must be generated at the same time as the table T. The tables $T_R$ and $T_{R-1}$ are generated at a marginal cost in execution time in parallel with the generation of the table T.

In this case, the variable z can be masked by executing the following calculation steps.

In an initial step 120 which is executed once only at the start of the procedure, the tables $\overline{A_1}, \ldots, \overline{A_m}$ are calculated from $T_R$ and $T_{R-1}$ according to the relation stating that $$\overline{A_i}[x] = T_R[A_i T_{R-1}[x]] \quad (7)$$

for every $1 \leq i \leq m$.

In a first step 121, a random variable r' is generated from the finite field $GF(2^N)$ and the variable r" is calculated from r', from the tables $\overline{A_1}, \ldots, \overline{A_m}$, and from the random factor r used to mask the sensitive variables $z_1, \ldots z_m$ according to the following relation:

$$r'' = (\overline{A_1}[r] + \ldots + \overline{A_m}[r]) + r' \quad (8)$$

In a second step 122, the result of the masking $\overline{z}$ is initialized according to the following relation:

$$\overline{z} = \overline{A_1}[\overline{z_1}] + r'' \quad (9)$$

In a third iteration step 123, the masked variable $\overline{z}$ is updated by carrying out the following calculation for i varying from 2 to m:

$$\overline{z} = \overline{z} + \overline{A_i}[\overline{z_i}] \quad (10)$$

In a final step 124, the variable $\overline{z}$ which is the result 104 of the affine masking of the linear combination of m other variables is delivered:

$$\overline{z} = \overline{z} + r + r' \quad (11)$$

Thus the method according to the invention optimizes the execution of the affine masking of linear operations.

The affine masking of the result of non-linear transformations, which can also be implemented by an encryption algorithm, is processed by the masking method according to the invention in the following way.

Let S be a non-linear operation which relates the variable y to the variable y' according to the following relation:

$$y' = S(y) \quad (12)$$

where y is a sensitive variable and $\overline{y}$ is its version masked by the affine masking method according to the invention, written with the aid of the relation $\overline{y} = R \cdot y + r$.

It is then necessary to calculate the masked version $\overline{y'}$ of y'.

In a first step, an adapted version S' of the linear operation S is calculated, as defined by the following relation:

$$S'(\bullet) = R \cdot S(R^{-1} \cdot (\bullet + r)) + r \quad (13)$$

In a second step, the result of the operation $\overline{y'}$ is delivered by applying the operation S' to the masked variable $\overline{y}$:

$$\overline{y'} = S'(\overline{y}) \quad (14)$$

The generation of the invertible random matrix R used by the affine masking method according to the invention must be efficient in terms of the complexity of the calculations used in order to avoid giving rise to considerable additional costs of implementation. Moreover, the matrix R must meet a security criterion, in that the number of randomly generated matrices R must be large enough to prevent any attack aimed at discovering the masking system.

Figure 2:
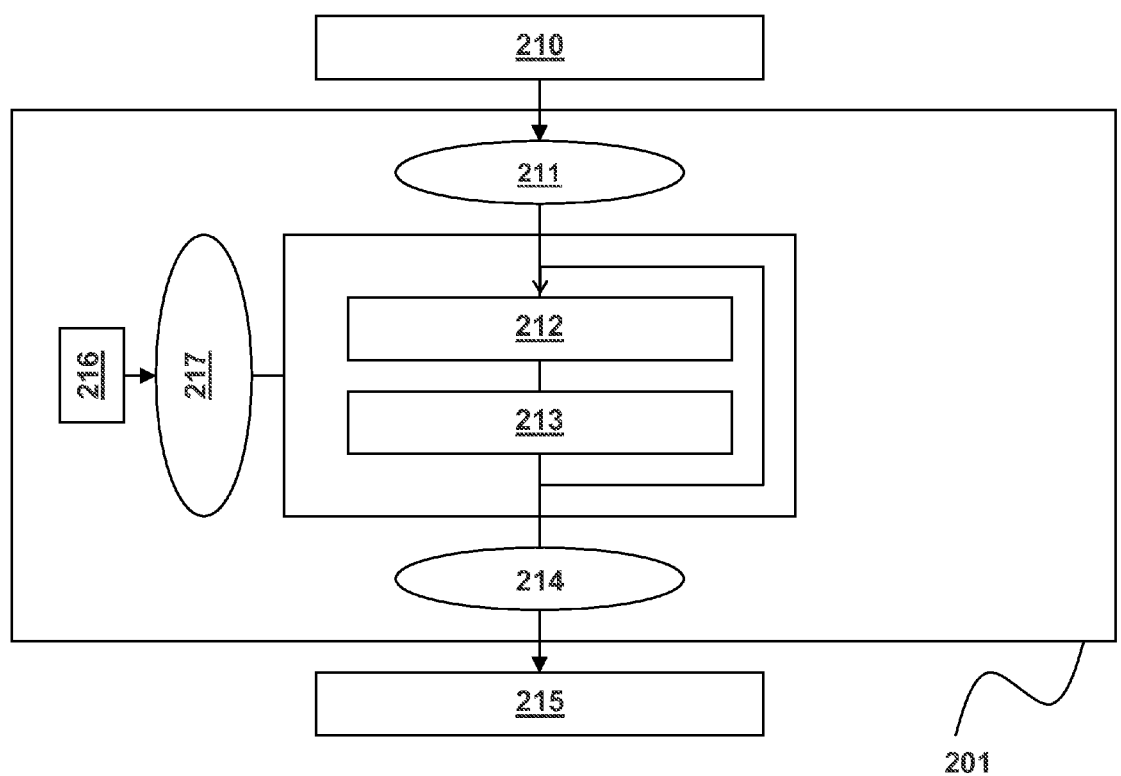
FIG. 2 is a synoptic diagram of a first example of a device according to the invention.

FIG. 2 is a schematic view of an example of a device 201 according to the invention protected by one or more affine masking operations according to the invention. This device executes an encryption algorithm, for example. A message 210 is received at the input of the device 201. This message is subjected to a first affine masking operation 211 to make it impossible to interpret. When masked according to the invention, the message 210 undergoes a series of linear operations 212 and non-linear operations 213 which form part of the processes natively implemented in said device 201 but which are adapted according to the invention in order to deliver at their output a compatible masked message of the method according to the invention. In parallel, a key 216, such as an encryption key, is received by the device 201 and also undergoes an affine masking operation 217 according to the invention. The internal variables handled by the device 201 are thus protected from any side channel attack. The message 210 which is masked and then handled by the linear and non-linear operations executed on the device 201 is then unmasked 214 by an operation which is the inverse of that in which a sensitive variable is replaced by its masked version, and the encoded message 215 is then delivered at the output.

Figure 3:
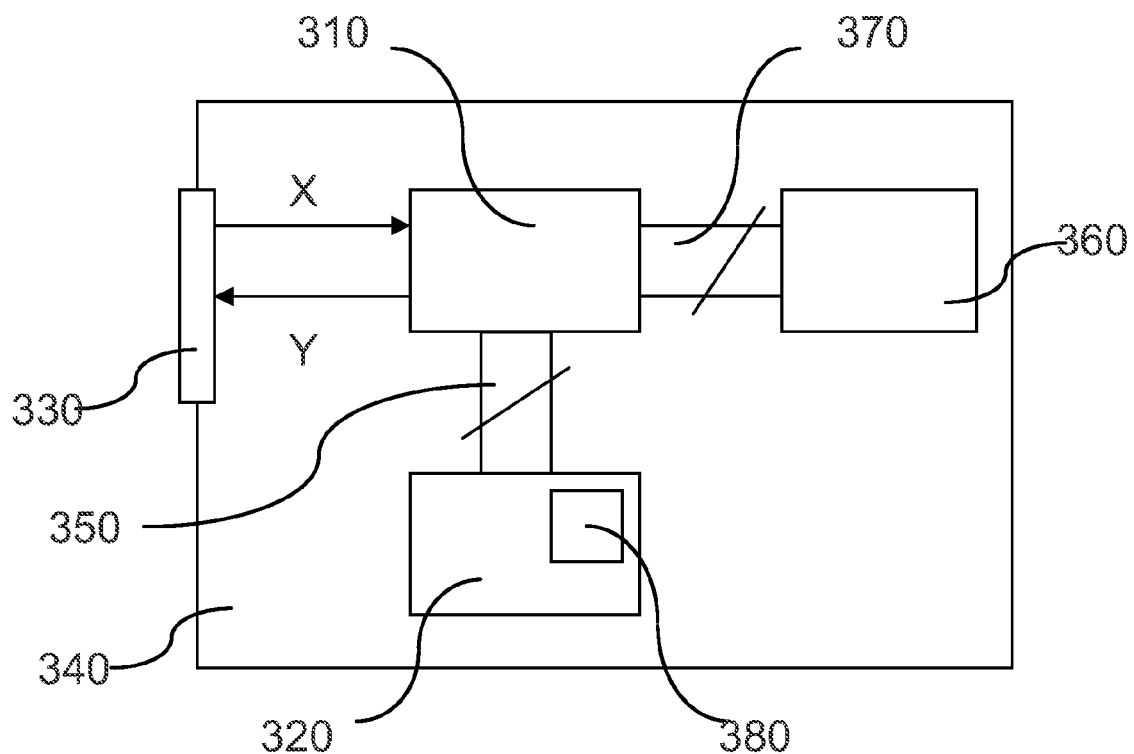
FIG. 3 is a synoptic diagram of a second example of a device according to the invention.

FIG. 3 shows in a schematic way a data processing device 340 in which the present invention is applied. This device 340 comprises a microprocessor 310 which is associated with a random access memory 360, by means of a bus 370 for example, and also with a non-volatile memory 320 (such as an EEPROM), by means of a bus 50 for example.

The data processing device 340, and more specifically the microprocessor 310 incorporated in it, can exchange data with external devices by means of a communication interface 330.

FIG. 3 shows schematically the transmission of an input data element X received from an external device (not shown) and transmitted from the communication interface 330 to the microprocessor 310. The transmission of an output data element S of the microprocessor 310 towards the communication interface 330 to be sent on to an external device is represented in a similar way. This output data element Y originates from the processing of data by the microprocessor 310, generally carried out on the input data element X using a secret key 380 internal to the system, such as a private key.

Although, for the purposes of illustration, the input data and the output data are shown on two different arrows, the physical means of communication between the microprocessor 310 and the interface 330 can be made in the form of a single means, such as a serial communications port or a bus.

The microprocessor 310 can run software (or a computer program) which enables the data processing device 340 to execute a method according to the invention, examples of which are provided facing FIGS. 1a and 1b. The software is composed of a set of instructions for controlling the microprocessor 310, which are, for example, stored in the memory 320.

In a variant, the assembly formed by the microprocessor 310, non-volatile memory 320 and random access memory 360 can be replaced with a special-purpose circuit which comprises means for implementing the different steps of the data processing method.

Figure 4:
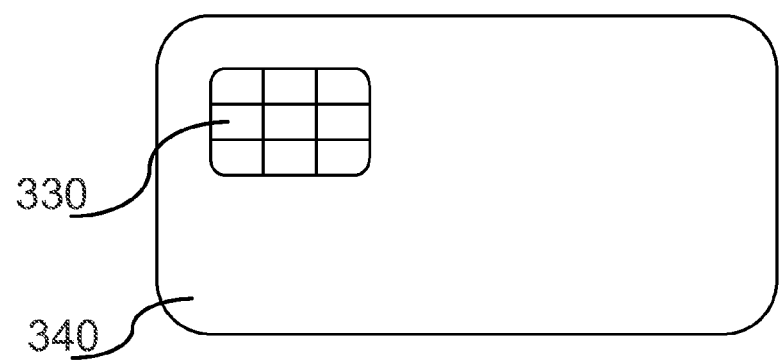
FIG. 4 is a diagram of a microcircuit card which implements the method according to the invention.

FIG. 4 shows a microcircuit card which provides an example of a data processing device according to the invention as shown in FIG. 3. In this case, the communication interface 330 is created by means of the contacts of the microcircuit card. The microcircuit card incorporates a microprocessor 310, a random access memory 360 and a non-volatile memory 320 as shown in FIG. 3.

This microcircuit card conforms to the ISO 7816 standard, for example, and is provided with a secure microcontroller which incorporates the microprocessor (or CPU) 320 and the random access memory 360.

In a variant, the data processing device can be a flash drive, a document or a paper medium which incorporates in one of its pages a microcircuit associated with contactless communication means. Preferably, it is a portable or pocket electronic apparatus.

The method according to the invention has the notable advantage of being simple to implement while being compatible with linear and non-linear operations executed on the sensitive variables protected according to the invention.

The invention also has the advantage of yielding significantly better results than those of the known prior art solutions against known side channel attacks of orders above 2.

In fact, the prior art solution using masking based on XOR operations cannot resist second-order side channel attacks. This is due to the fact that, for any sensitive variable x, an attacker can find two intermediate variables $v_1$ and $v_2$ such that $x = v_1 \oplus v_2$, and the power consumption $C(x)$ associated with the variable x can be predicted from $|C(v_1) - C(v_2)|$. However, this prediction is not possible if the variables $v_1$ and $v_2$ are masked by an affine masking method according to the invention. In fact, the correlation of $C(x)$ with $|C(v_1) - C(v_2)|$ decreases rapidly with the size n of the vector x, as shown in Table 1.2. The same conclusion can be reached if we attempt to predict $C(x)$ from $C(v_1) \times C(v_2)$, as indicated in Table 1.2.

Let $x_1$ and $x_2$ be two random variables distributed uniformly in the space $\{0,1\}^n$. Table 1.1 compares the correlations between $x = x_1 \oplus x_2$ and the variables $x_1$ and $x_2$ masked by an XOR masking method. The metrics used to analyse the performance of this method are as follows.

$$Cor(|HW(x_1 \oplus r) - HW(x_2 \oplus r)|^\beta; HW(x)) \qquad (15)$$

and $$Cor(|HW(x_1 \oplus r).HW(x_2 \oplus r)|^\beta; HW(x)) \qquad (16)$$

where HW(x) is the Hamming weight of the vector x.

TABLE 1.1

| | Cor(\|HW $(x_1 \oplus r)$ − HW $(x_2 \oplus r)\|^\beta$; HW (x)) | | | Cor(\|HW $(x_1 \oplus r)$ · HW $(x_2 \oplus r)\|^\beta$; HW (x)) | | |
|---|---|---|---|---|---|---|
| n | $\beta = 1$ | $\beta = 2$ | $\beta = 3$ | $\beta = 1$ | $\beta = 2$ | $\beta = 3$ |
| 1 | 1 | 1 | 1 | −0.578007 | −0.579426 | −0.579963 |
| 2 | 0.532322 | 0.579113 | 0.568336 | −0.315755 | −0.366913 | −0.368015 |
| 3 | 0.411518 | 0.452034 | 0.438087 | −0.217523 | −0.284781 | −0.293768 |
| 4 | 0.351401 | 0.381051 | 0.368472 | −0.169834 | −0.233549 | −0.249807 |
| 5 | 0.304950 | 0.333761 | 0.324023 | −0.137339 | −0.198963 | −0.217753 |
| 6 | 0.279849 | 0.302910 | 0.291607 | −0.117385 | −0.173757 | −0.197643 |
| 7 | 0.258828 | 0.276712 | 0.268064 | −0.101258 | −0.151014 | −0.179686 |
| 8 | 0.236417 | 0.261128 | 0.249791 | −0.087109 | −0.136167 | −0.164959 |

Table 2.1 shows the same results, applied on this occasion to the affine masking method according to the invention; the metrics used are as follows:

$$Cor(|HW(Rx_1 \oplus r) - HW(Rx_2 \oplus r)|^\beta; HW(x)) \quad (17)$$

$$Cor(|HW(Rx_1 \oplus r) \cdot HW(Rx_2 \oplus r)|^\beta; HW(x)) \quad (18)$$

TABLE 2.2

| | Cor(\|HW (Rx$_1$ ⊕ r) − HW (Rx$_2$ ⊕ r)\|$^\beta$; HW (x)) | | | Cor(\|HW (Rx$_1$ ⊕ r) · HW (Rx$_2$ ⊕ r)\|$^\beta$; HW (x)) | | |
|---|---|---|---|---|---|---|
| n | β = 1 | β = 2 | β = 3 | β = 1 | β = 2 | β = 3 |
| 1 | 1 | 1 | 1 | −0.574882 | −0.573609 | −0.579249 |
| 2 | 0.535827 | 0.386256 | 0.285722 | −0.209768 | −0.270511 | −0.316286 |
| 3 | 0.298929 | 0.191070 | 0.136149 | −0.090795 | −0.137604 | −0.164889 |
| 4 | 0.162631 | 0.103208 | 0.070132 | −0.043678 | −0.067954 | −0.080933 |
| 5 | 0.091369 | 0.051445 | 0.034176 | −0.021675 | −0.035601 | −0.040952 |
| 6 | 0.053028 | 0.030678 | 0.025059 | −0.009192 | −0.017957 | −0.019982 |
| 7 | 0.030603 | 0.014429 | 0.010588 | −0.006485 | −0.006548 | −0.011328 |
| 8 | 0.011109 | 0.006532 | 0.004693 | −0.002205 | −0.002554 | −0.006627 |

Tables 1.1 and 1.2 show that the metrics in question decrease strongly when n increases in the case of the affine masking method according to the invention. The metrics defined by the relations 15, 16, 17 and 18 use the Hamming weight of a variable x, because there is a known method of approximating the power consumption related to the variable x with the Hamming weight of the same variable x.

These results show that the information associated with two (or more) points on the measurements corresponding to the intermediate data processing of the form $Rx_1+r$ and $Rx_2+r$ is much more weakly correlated with $x_1+x_2$ than in the prior art solution which has been described. The invention thus makes it possible to resist known attacks of orders greater than 1.

What is claimed is:

1. A method of executing an algorithm, said method comprising protecting an electronic device by affine masking, wherein said device executes operations on secret variables x, said secret variables x being binary vectors of a given size N other than zero, said method further comprising replacing said secret variables x using an affine masking operation, by the following affine function: m(x)=R.x+r, where R is a random invertible binary matrix with N rows and N columns and r is a random binary vector of size N,
   wherein said electronic device executes at least one linear operation on a set of secret variables $z_1, \ldots, z_m$, producing the result $z=A_1z_1+A_2z_2+ \ldots +A_mz_m$, where the variables $A_1, A_2 \ldots A_m$ are matrices, each of which commutes with the matrix R and its inverse $R^{-1}$, and the operation of the affine masking of said result z is carried out by the following steps:
   apply said operation of affine masking to the set of said variables $z_1, \ldots z_m$ in order to produce the set of masked variables $\overline{z_1}, \ldots, \overline{z_m}$;
   determine, from said random vector r and a second random binary vector r', a third random vector r''=r'(A$_1$+ . . . +A$_m$)r; and
   determine the result $\overline{z}$ of the affine masking operation applied to the result z of said linear operation, by the following calculation steps:

$\overline{z}=A_1\overline{z_1}+r''$

For i varying from 2 to m, $\overline{z}=\overline{z}+A_i\overline{z_i}$ $\overline{z}=\overline{z}+r+r'$.

2. An electronic device which executes operations on secret variables x, comprising a processor and a memory configured to protect said variables x by using the steps of the affine masking protection method according to claim 1.

3. The electronic device according to claim 2, wherein said device is a microcircuit card.

4. A method of executing an algorithm, said method comprising protecting an electronic device by affine masking, wherein said device executes operations on secret variable x, said secret variables x being binary vectors of a given size N other than zero, said method further comprising replacing said secret variables x using an affine masking operation, by the following affine function: m(x)=R.x +r, where R is a random invertible binary matrix with N rows and N columns and r is a random binary vector of size N, wherein said electronic device executes at least one linear operation on a set of secret variables $z_1, \ldots, z_m$ of size N, producing the result $z=A_1z_1+A_2z_2+ \ldots +A_mz_m$, where the variables $A_1, A_2 \ldots A_m$ are matrices which do not commute with the matrix R or its inverse $R^{-1}$, and the operation of the affine masking of said result z is executed by the following steps:
   determine, for the set of said binary vectors x of size N, the table $T_R$, such that $T_R[x]=R.x$;
   determine, for the set of said binary vectors x of size N, the table $T_R^{-1}$, such that $T_R^{-1}[x]=R^{-1}x$;
   determine, for the set of said binary vectors x of size N, the tables $\overline{A_i}$ such that $\overline{A_i}[x]=T_R[A_iT_{R^{-1}}[x]]$, for i varying from 1 to m;
   apply said operation of affine masking to the set of said variables $z_1, \ldots z_m$ in order to produce the set of masked variables $\overline{z_1}, \ldots, \overline{z_m}$;
   calculate, from said random vector r and a second random binary vector r', the binary vector r''=$(\overline{A_1}[r]+ \ldots + \overline{A_m}[r])$+r'; and
   determine the result $\overline{z}$ of the affine masking operation applied to the result z of said linear operation, by the following calculation steps:

$\overline{z}=A_1[\overline{z_1}]+r''$

For i varying from 2 to m, $\overline{z}=\overline{z}+\overline{A_i}[\overline{z_i}]$ $\overline{z}=\overline{z}+r+r'$.

5. An electronic device which executes operations on secret variables x, comprising a processor and a memory configured to protect said variables x by using the steps of the affine masking protection method according to claim 4.

6. The electronic device according to claim 5, wherein said device is a microcircuit card.

7. A method of executing an algorithm, said method comprising protecting an electronic device by affine masking, wherein said device executes operations on secret variable x, said secret variables x being binary vectors of a given size N other than zero, said method further comprising replacing said secret variables x using an affine masking operation, by the following affine function: $m(x)=R.x+r$, where R is a random invertible binary matrix with N rows and N columns and r is a random binary vector of size N, wherein said electronic device executes at least one non-linear operation S on at least one secret variable y, producing the result $y'=S(y)$, and in that the operation of affine masking of said result y' is executed by the following steps:

apply said affine masking operation to the secret variable y in order to produce the result $\bar{y}=R \cdot y+r$;

determine an adapted operation S' of the non-linear operation S by the following relation: $S'(\bullet)=R \cdot S(R^{-1} \cdot (\bullet + r))+r$; and determine the result $\bar{y'}$ of the affine masking operation applied to the result y' of said non-linear operation, by the following relation: $\bar{y'}=S'(\bar{y})$.

8. An electronic device which executes operations on secret variables x, comprising a processor and a memory configured to protect said variables x by using the steps of the affine masking protection method according to claim 7.

9. The electronic device according to claim 8, wherein said device is a microcircuit card.

10. The method according to any of claims 1, 4, or 7, wherein said operation of the affine masking of a secret variable x is executed by the following steps:

generate, for each binary vector z of size N, the table T such that $T[z]=Rz+r$; and replace said secret variable x with $T[x]$.

11. An electronic device which executes operations on secret variables x, comprising a processor and a memory configured to protect said variables x by using the steps of the affine masking protection method according to claim 10.

12. The electronic device according to claim 11, wherein said device is a microcircuit card.

13. The method according to any of claims 1, 4, or 7, wherein said electronic device executes a cryptographic algorithm.

14. An electronic device which executes operations on secret variables x, comprising a processor and a memory configured to protect said variables x by using the steps of the affine masking protection method according to claim 13.

15. The electronic device according to claim 14, wherein said device is a microcircuit card.

* * * * *